United States Patent [19]

Iftikar et al.

[11] Patent Number: 4,965,691
[45] Date of Patent: Oct. 23, 1990

[54] SEALED REMOVABLE CARTRIDGE FOR USE WITH A HIGH DENSITY DISC DRIVE WITH MAGNETIC CLUTCH

[75] Inventors: Syed H. Iftikar; John J. Mandish, both of Fremont, Calif.

[73] Assignee: Syquest Technology, Fremont, Calif.

[21] Appl. No.: 270,005

[22] Filed: Nov. 14, 1988

[51] Int. Cl.$^5$ ............... G11B 23/03; G11B 33/14; G11B 5/55

[52] U.S. Cl. ............... 360/133; 360/106; 360/97.03; 360/99.08

[58] Field of Search .............. 360/133, 86, 97.01, 360/97.02, 99.04, 99.08, 106, 97.03; 206/444, 312, 313; 369/291

[56] References Cited

U.S. PATENT DOCUMENTS

| | | | |
|---|---|---|---|
| 4,359,762 | 11/1932 | Stollorz | 360/133 X |
| 4,367,503 | 1/1983 | Treseder | 360/133 X |
| 4,471,397 | 9/1984 | Cloutier | 360/133 |
| 4,535,434 | 8/1985 | Kishi | 360/133 X |
| 4,571,718 | 2/1986 | Cahill et al. | 369/291 |
| 4,581,667 | 4/1986 | Gerfast | 360/133 X |
| 4,636,904 | 1/1987 | Matsuno | 360/133 |
| 4,652,961 | 3/1987 | Dieffenbach | 206/444 X |
| 4,814,924 | 3/1989 | Ozeki | 369/291 X |

OTHER PUBLICATIONS

Design of a Disk File Head-Positioning Servo, Oswald IBM J. Res., Develop, Nov. 1974, Engineering Design of a Disk Storage Facility with Data Modules, Mulvany, IBM J. Res. Develop, Nov. 1974.

Primary Examiner—Robert S. Tupper
Assistant Examiner—Andrew L. Sniezek
Attorney, Agent, or Firm—Fliesler, Dubb, Meyer & Lovejoy

[57] ABSTRACT

A sealed cartridge 22 vor selective use in a disc drive 20 includes a sealed housing 70 with a disc 72 positioned therein and heads 80, 81 positioned relative to the disc. An actuator mechanism 84 is provided for use with an actuator arrangement 47 of the disc drive 20 in order that the actuator mechanism 84 and the actuator arrangement 47 can cooperate to move the heads 80, 81 relative to the disc 72. A magnetic coupling mechanism 77 is adapted for magnetically coupling the disc 72 to the disc drive 20 in order to allow the disc drive 20 to rotate the disc 72, without the magnetic coupling mechanism 77 physically touching the disc drive 20.

45 Claims, 8 Drawing Sheets

SEALED REMOVABLE CARTRIDGE FOR USE WITH A HIGH DENSITY DISC DRIVE WITH MAGNETIC CLUTCH

FIELD OF THE INVENTION

The present invention is related to a sealed, high density, removable cartridge containing media on which data may be stored, which cartridge is capable of being received in a disc drive.

BACKGROUND OF THE INVENTION

With the exception of the present Assignee, Syquest Technology, attempts to provide for a disc drive which can receive a removable cartridge containing data storage media have met with only limited success. Problems (1) inherent in providing a cartridge receiver mechanism for accurately aligning a cartridge and a disc with respect to read/write heads and a spindle motor, and (2) associated with loading and unloading read/write heads onto the disc without damage to either the heads or the disc, are difficult to design for as capacities are increased, and therefore places a limitation on the amount of data that can be stored. As a further data storage limitation, the cartridges usually contain only one disc for data storage. Thus the market for such removable cartridges and removable cartridge disc drives is a highly specialized one. Such drives are typically provided where the removable cartridge must be locked up between uses for security reasons.

On the high end of the spectrum, during the mid-nineteen-seventies, IBM introduced a Winchester drive (IBM 3340) with a removable data module having a capacity of 30 megabytes. This disc drive was used with large IBM mainframes and not with micro and personal computers. This data module used a plurality of 14-inch discs and weighed approximately 20 pounds. The disc drive had a complex mechanism with levers and gears to receive the data module. The data module required a number of connections to the disc drive in order for the module and drive to operate. First there needed to be a mechanical connector for transporting electrical signals between the drive and the data module. Then there were alignment devices such as docking pins to hold the data module in alignment with the drive. Further a spindle mechanism including a belt and pulley needed to be operably engaged with the module in order to spin the discs at an accurate speed. A mechanical connection needed to be made between a carriage which supported multiple read/write heads, which were positionable relative to the discs, and a voice coil actuator which was part of the drive. Finally a shutter mechanism had to be incorporated in order to allow the actuator mechanism to be insertable into the data module so that the actuator mechanism could engage with the carriage which supported the read/write heads.

Quite naturally, while such a device had commercial success, it was expensive and cumbersome to use and not suitable for the price-competitive low-end markets which demands the capabilities and performance of high-end machines. Further contamination of the discs and heads was possible due to the need to open the shutter mechanism each time the data module was engaged with the disc drive.

Another product manufactured by New World Computers had a data module with a five-megabyte storage capacity. As with the IBM 3340, the module had media, spindle and read/write heads, all located inside of the module. The heads were of a multiple element, fixed-arm design. This design was quite expensive to implement due to the multiple head elements required per disc surface, and had limited performance.

Considering the prior art, there is still a need for an accurate, relatively inexpensive, high capacity disc drive with a removable cartridge.

SUMMARY OF THE INVENTION

The present invention is directed towards providing a high capacity, sealed, removable cartridge which is capable of being used in a disc drive.

It is an object of the present invention to provide a cartridge that does not have the alignment constraints of prior devices.

It is an object of the present invention to provide for a cartridge, which can be urged into a disc drive in a straight-in motion, without having the position of the cartridge manipulated by a receiver mechanism of the disc drive in order to have the cartridge set down on a spindle motor in an aligned manner.

It is a further object of the present invention to provide a cartridge with a hub assembly which positions a disc inside of the sealed cartridge and which can engage a spindle mechanism of a disc drive, so as to cause the disc to rotate without the spindle mechanism physically engaging the hub assembly.

It is an object of the present invention to provide for a magnetic armature plate as part of the hub assembly located in the cartridge which engages a magnetic clutch mechanism of the spindle mechanism.

It is an object of the present invention to provide for an actuator, such as for example a voice coil motor, which is in part located in a sealed cartridge and in part in the drive.

It is yet an object of the invention to provide for data transfer between the cartridge and disc drive in a manner that does not require a physical or hard connection between the cartridge and the disc drive.

It is a further object of the present invention to provide for a sealed cartridge which does not have to be connected in any physical way to a disc drive and does not required access into the cartridge for the loading of heads onto a disc and for the actuation of the heads.

The invention includes a sealed cartridge adapted for selective use in disc drive which comprises a sealed housing, a disc positioned in the housing and a head positioned in the housing in association with the disc. The cartridge includes a device for rotationally mounting the disc in the housing and a device for movably mounting the head in the housing so that the head can move relative to the disc. Further a cartridge actuator mechanism adapted for use with an actuator arrangement of a disc drive is provided in order that the actuator means and the actuator arrangement can cooperate to move the head relative to the disc. A magnetic coupling mechanism is adapted for magnetically coupling the disc to the disc drive in order that the disc drive can cause the disc to rotate without the magnetic coupling means physically touching the disc drive.

In another aspect of the invention, the actuator mechanism includes a coil assembly which is disposed within the housing with a permanent magnet provided in the disc drive. The coil and the permanent magnet cooperate to actuate the head relative to the disc. In yet another aspect of the invention, the permanent magnet is located in the housing of the cartridge and the coil is located in the disc drive.

In a further aspect of the invention a communication device, such as for example an infrared source and sensor, is used to transmit data between the sealed cartridge and the housing.

In another aspect of the invention, a battery mechanism is provided in the cartridge for facilitating the transfer of data between the cartridge and a disc drive.

According to the above arrangement the cartridge can be hermetically sealed in a clean room, eliminating contamination problems. Further, problems associated with the head loading and unloading can be eliminated as the heads are always loaded onto the disc in the cartridge.

In yet another aspect of the invention, the housing is filled with inert gas in order to prevent condensation problems, reduce friction and allow the heads to fly lower with respect to the disc, thereby increasing the data density.

DETAILED DESCRIPTION OF THE PREFERRED EMBODIMENT

Figure 1:
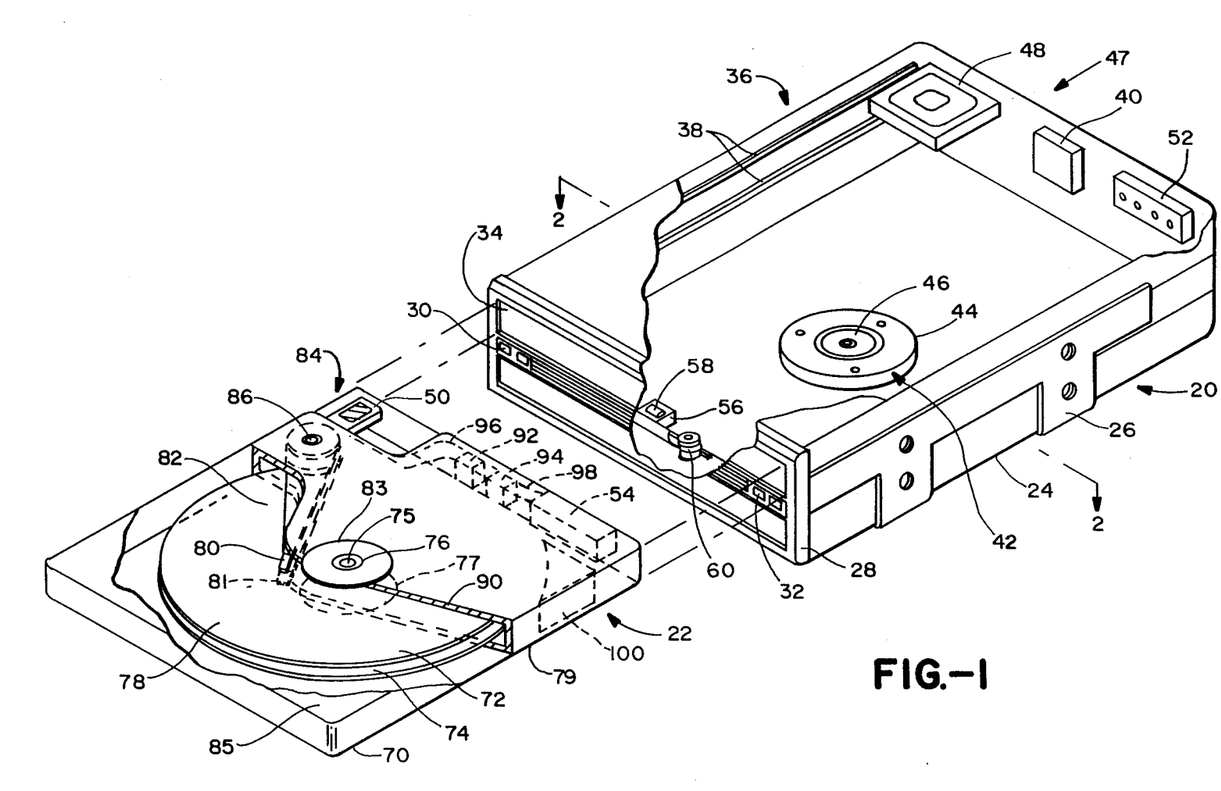
FIG. 1 depicts an embodiment of the disc drive of the invention which can accept an embodiment of a sealed cartridge of the invention and includes an actuator coil positioned in the drive.

With reference to the figures and in particular FIG. 1 a disc drive 20 and a sealed removable cartridge 22 of the invention are depicted. Disc drive 20 includes a housing 24 with side mounting brackets 26. Housing 24 further includes a faceplate 28. Faceplate 28 includes a cartridge ejection button 30 and a mode selection button 32. The faceplate 28 further includes a hinged door 34 which is urged out of the way by the sealed cartridge 22 as it is inserted into the disc drive 20.

A receiver mechanism 36 for the disc drive includes tracks 38 upon which the sealed cartridge 22 slides as it is inserted into the drive 20. These tracks 38 allow the cartridge 22 to be inserted in a straight-in manner. The receiver mechanism 36 includes a stop 40 which limits the rearward motion of cartridge 22 as it is inserted into the drive 20.

Figure 2:
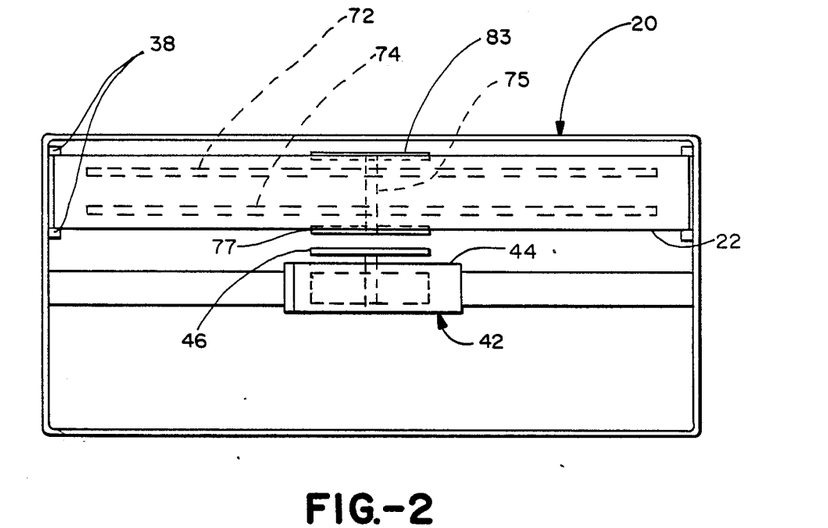
FIG. 2 depicts a sectional view taken through line 2—2 in FIG. 1 with a cartridge inserted into the drive.

The disc drive 20 further includes a spindle motor assembly 42 which is mounted to the housing 24. The spindle motor assembly 42 includes a motor 44 and a clutch plate 46 which is comprised in a preferred embodiment of eight alternating north and south poles. It is to be understood that there may be as few as only a single north and a single south pole in the clutch plate 46 as well as many more than the eight alternating north and south poles. As can be seen in FIG. 2, with the cartridge 22 inserted into the housing 24, cartridge 22 as will be described more fully hereinbelow, is spaced from the clutch plate 46 and the spindle motor assembly 42 so that there is no physical connection between the clutch plate 46 and the spindle motor assembly 42.

In FIG. 1 the disc drive 20 further includes an actuator 47 which in a preferred embodiment is comprised of a coil 48 such as used, in voice coil motor actuators for disc drives in general. This coil 48 is positioned in the disc drive 20 in such a way that it can be used, in conjunction with permanent magnet 50 in cartridge 22, to actuate the read/write heads positioned in the sealed cartridge 22 as will be explained hereinbelow.

Figure 3:
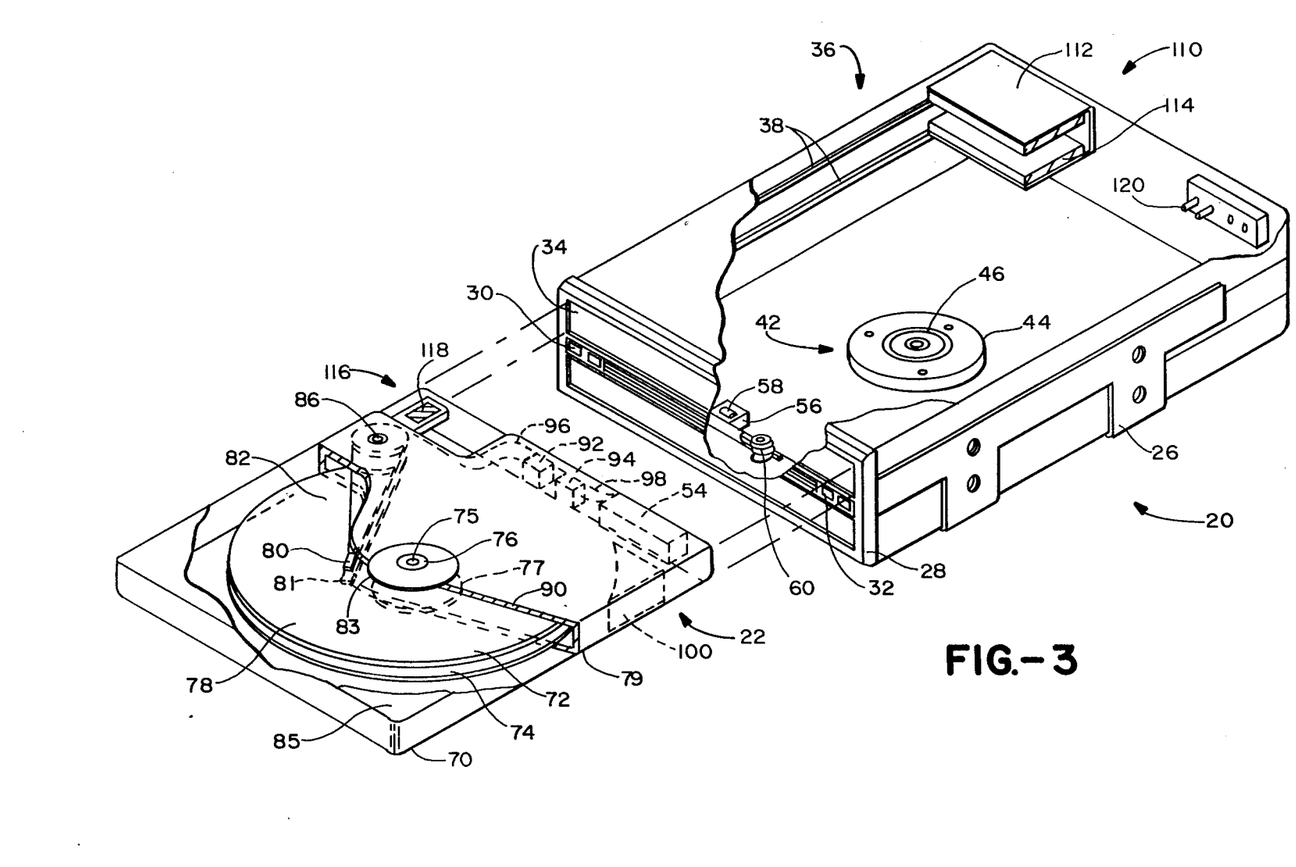
FIG. 3 depicts an embodiment of the invention similar to FIG. 1 but with an actuator permanent magnet located in the drive.

Further the disc drive 20 includes a data transfer connector 52 which is compatable with a connector of the cartridge 22 as will be explained hereinbelow. In a preferred embodiment this connector 52 includes an infrared sensor and an infrared source for allowing data to be transferred between the drive 20 and the cartridge 22 without physical contact between the connector 52 on the drive 20 and the connector 54 on the sealed cartridge 22. It is to be understood that the connectors 52, 54 can alternatively be comprised of transformers in order to transmit data to and from the sealed cartridge 22. Further as an alternative embodiment the connector 52 can include contact points which are physically directly contacted with the contact points of the connector 54 on the cartridge 22. Still further a prong and receptacle arrangement such as shown in FIG. 3 can be used to transfer data. It is to be understood that if the cartridge 22 is not provided with battery power for operating the circuitry associated with data communication, as explained below, that power can also be conducted through the connector 52 to the connector 54 by a direct contact mechanism or a plug to receptacle mechanism.

Disc drive 20 includes a cartridge loading and unloading motor 56 which powers a roller 58, which in a preferred embodiment can be comprised of rubber, in a clockwise direction in order to load the cartridge into the housing 24 and in a counterclockwise manner in order to unload the cartridge 22 from the housing 24. Cartridge loading motor 56 brings the cartridge 22 to rest against stop 40. Depressing button 30 causes motor 56 to eject cartridge 22 from disc drive 20.

The disc drive 20 further includes a cartridge locking plunger 60 which is shown in FIG. 1 in solid lines in an unlocked position and in phantom lines in a locked position. This cartridge locking plunger 60 causes a cartridge to be locked in to the housing 24 against the stop 40. Depressing button 30 also releases plunger 60 from the loaded position.

The cartridge 22 of the invention is also depicted in FIG. 1. Cartridge 22 includes a housing 70 which in a preferred embodiment is comprised of a rugged plastic material. Located inside of the cartridge 22 in a preferred embodiment are two data storage discs 72, 74. These discs 72, 74 are mounted for rotation about axis 75 on a hub assembly 76. Hub assembly 76 includes armature plates 77, 83 which are located externally to cartridge housing 70 adjacent lower side 79 and the upper side of 85 of the sealed cartridge 22. In a preferred embodiment plates 77, 83 are comprised of alternating north and south magnetic poles that can be engaged by the clutch plate as described below.

With each major surface such as major surface 78 of disc 72, a head, such as read/write head 80, is associated. Other heads 81 are shown in a phantom below head 80. Thus in a preferred embodiment having two discs, four read/write heads are associated, one each associated with each of the major surfaces of each disc. The heads 80, 81 are supported by a head arm assembly 82. The head arm assembly 82 is secured to an actuator assembly 84 which is provided for rotation about axis 86. The axis 86 of rotation for head arm assembly 82 is substantially parallel, in a preferred embodiment, to that of axis 75 of the hub assembly 76. Secured to the actuator assembly 84 is the above-mentioned magnet 50. Thus movement of the magnet 50, which in a preferred embodiment is a permanent magnet, as caused by the coil 48 in the drive results in the movement of the read/write heads 80, 81 relative to the discs.

An internal housing 90, which in a preferred embodiment is comprised of steel, is located inside of the cartridge housing 70 and is used to mount the axes 86, 88 in order to provide the appropriate structural integrity for keeping these axes properly aligned.

Communicating with the read/write heads 80, 81 is an appropriate read/write circuitry 92 which is located inside the cartridge 20 and which is associated with an energy storage device such as the battery 94, which powers the read/write circuitry 92. A cable 96 provides communication between the heads 80, 81 and the read/write circuitry 92, while another cable 98 provides communication between the read/write circuitry 92 and the connector 54.

Also provided in the cartridge 22 is an air filter 100 which filters the gas which is provided in the cartridge 22.

In a preferred embodiment it is to be understood that an inert gas such as argon is used to fill the cartridge. This inert gas allows the heads 80, 81 to fly lower and closer to the discs and thus increases the capacity of the disc to store data. Further, as there is no atmosphere in cartridge 22, there is no condensation, and friction is reduced. After the gas is injected into the cartridge 22, cartridge 22 is hermetically sealed to all but eliminate contamination damage to the discs and heads.

In operation, the cartridge 22 is inserted into the door 34 of the disc drive 20 with the cartridge load motor 56 urging the cartridge into the disc drive 20 and against the stop 40.

With the cartridge 22 fully inserted into the drive 20 the armature plate 77, which is the circular magnetic plate located adjacent to the lower side 79 of the cartridge 22 comes into alignment with the magnetic clutch plate 46 of the spindle motor assembly 42. In a preferred embodiment, the eight north and south pole segments of the armature plate 77 engage with the eight north and south pole segments of the clutch plate 46 such that the turning of the clutch plate 46, as caused by the spindle motor 44, causes the armature plate 77 and thus the discs 72, 74 to spin at the proper rotational velocity.

The cartridge locking plunger 60 locks the cartridge in place with the permanent magnet 50 aligned underneath the coil 48 of the actuator 47. With power being applied to the coil 48, the magnet 50 is urged to move and properly position the heads relative to the disc. With the heads properly positioned, data can be transferred to or read from the discs by the use of the connectors 52, 54 which provide for the transfer of information from the cartridge to the disc drive.

An alternate embodiment of the invention is depicted in FIG. 3. In this embodiment the actuator 110 assocated with the drive 20 includes first and second magnets 112, 114 which in a preferred embodiment are permanant magnets. The cartridge 22 includes an actuator assembly 116 and a coil 118. Unlike the read/write circuitry 92, the coil 118 draws substantial power, requiring that power to be provided to the cartridge directly from drive 20 in order to operate the coil assembly 118. This being the case, a standard prong and receptacle arrangement is provided with prongs 120 extending from the data transfer connector 52 in the drive 20 for mating with the receptacles in the data transfer connector 54 of the cartridge 22.

Figure 4:
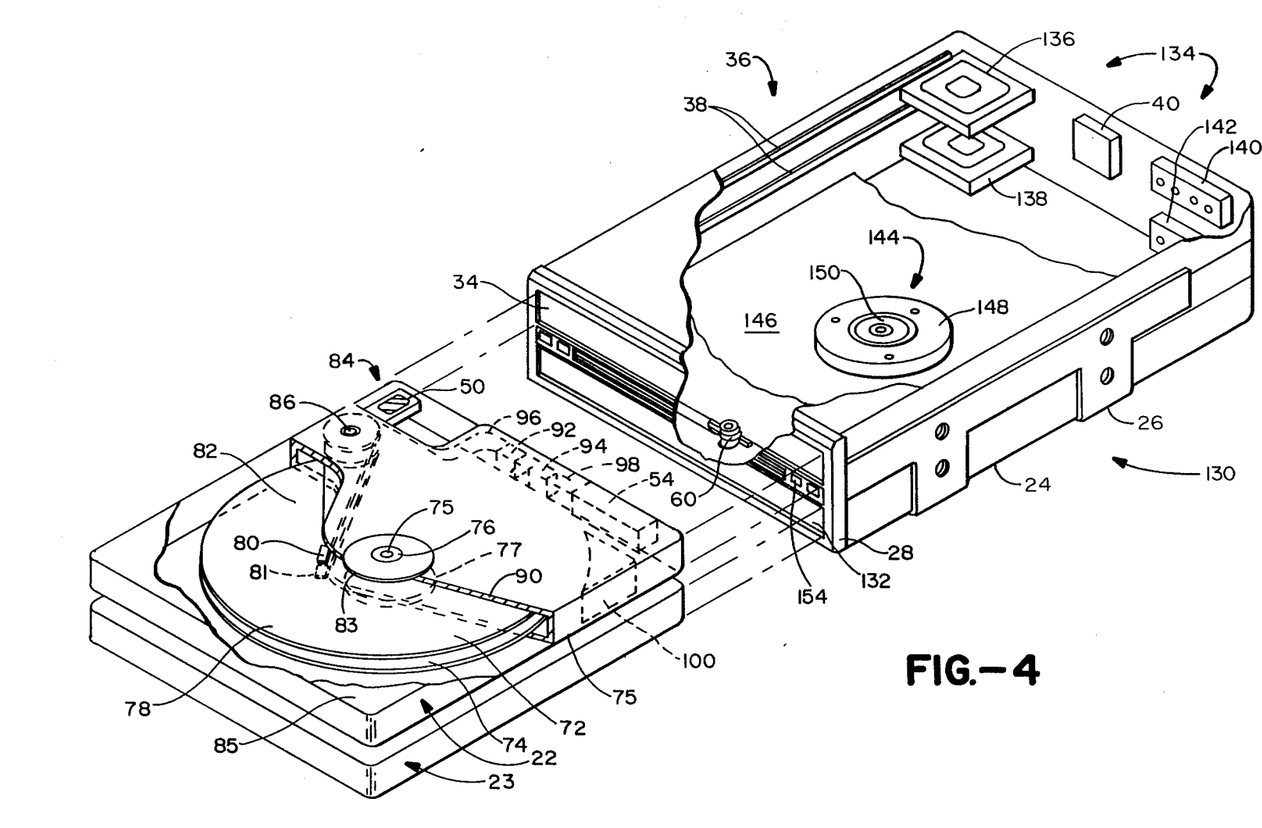
FIG. 4 depicts an embodiment of a disc drive of the invention which can receive two cartridges of the invention.
Figure 5:
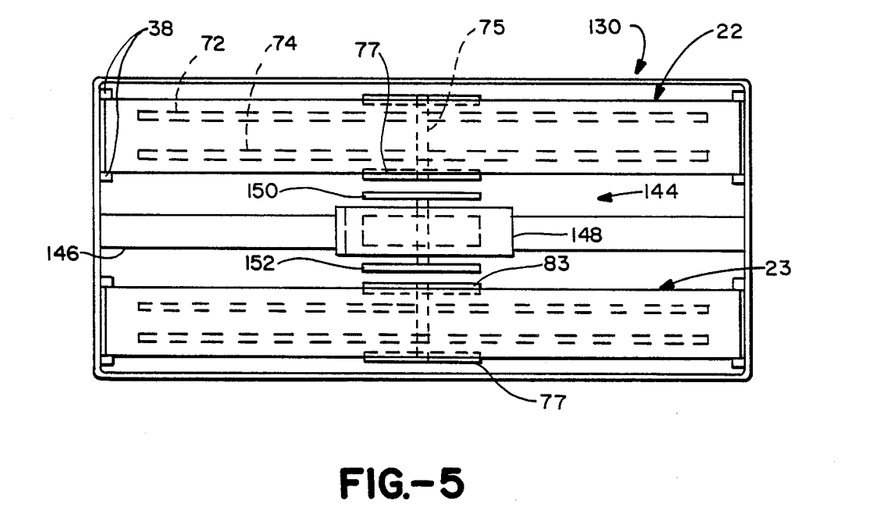
FIG. 5 depicts a sectional view of FIG. 4 through line 5—5 with two cartridges inserted into the disc drive.

Another alternative embodiment 130 of the invention is shown in FIGS. 4 and 5. In disc drive 130, elements which are similar to those shown in the embodiments in FIGS. 1 through 3 are numbered identically. In FIG. 4 it can be seen that the disc drive 130 is provided for receiving two cartridges, cartridges 22 and cartridge 23. Cartridge 22 is inserted as described hereinabove. Cartridge 23 is inserted through a second door 132. It is to be understood that cartridges 22 and 23 are identical.

The drive 130 includes an actuator assembly 134 which has first and second coils 136, 138. Each coil is used to actuate the magnets associated with the heads into the cartridges 22, 23 in order to cause the heads to traverse the discs. Disc drive 130 includes first and second connectors 140, 142 for providing data transfer connections to the cartridges that are inserted in the drive as discussed hereinabove.

The spindle motor assembly 144 is mounted through a plate 146 which divides the drive 130 into two compartments, one compartment for each of the cartridges 22, 23. The spindle motor assembly 144 includes a spindle motor 148, upper and lower magnetic clutch plates 150, 152 similar in design and concept to the magnetic clutch plate 46 in FIG. 1. A cartridge 22 inserted through the upper door 34 would have an armature plate, such as armature plate 77 in alignment with the upper magnetic clutch plate 150, while the armature plate 83 of cartidge 23 would be in alignment with the lower magnetic clutch plate 152.

Drive 130 includes a mode selector switch 154 which allows the drive 130 to be placed in one of the several modes. The first mode allows a host computer to selectively place data on one or the other cartridge as directed by the host.

The second mode allows for automatic and instantaneous backup, in that data is recorded simultaneously on both the first cartridge as the primary cartridge and on the second cartridge as the backup cartridge.

Figure 6:
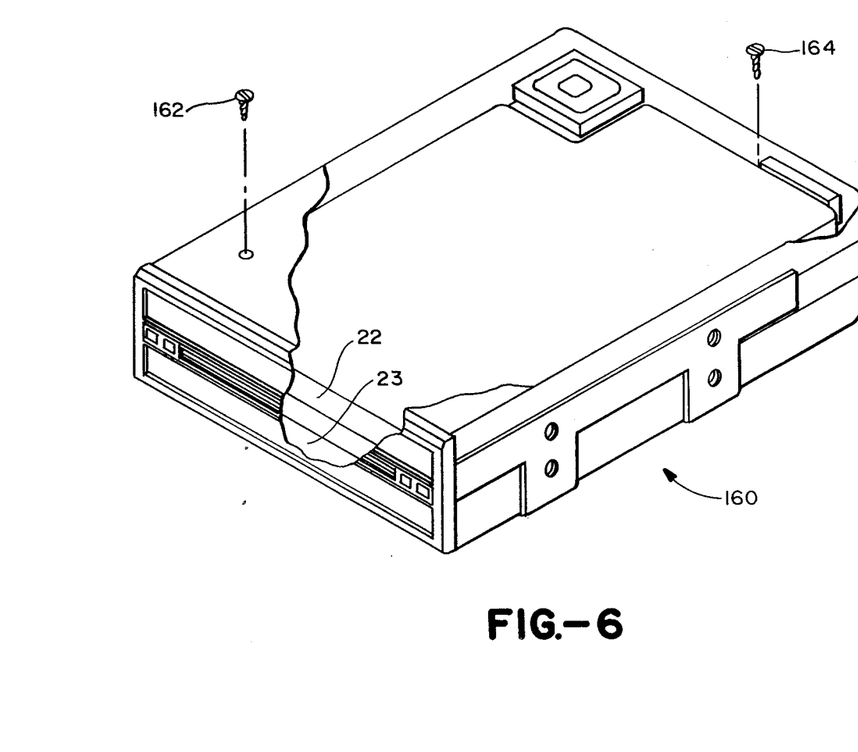
FIG. 6 depicts a disc drive which accepts two cartridges and which cartridges can be secured permanently in the drive to provide for a disc drive with fixed cartridges and thus fixed discs.

Another embodiment of the invention is shown in FIG. 6. In this embodiment cartridges 22 and 23 are permanently affixed into drive 160 by appropriate securing mechanisms such as screws 162, 164. Thus the disc drive of the invention can be converted into a fixed drive with the capacity of currently available fixed drives. It is to be understood that in a preferred embodiment, each disc in the cartridge contains approximately fifty to one hundred megabytes of information and thus each cartridge can contain approximately one hundred to two hundred megabytes of information. The two cartridges fixed into drive 160 giving this drive 160 the capability of storing up to 400 megabytes of data.

Figure 7:
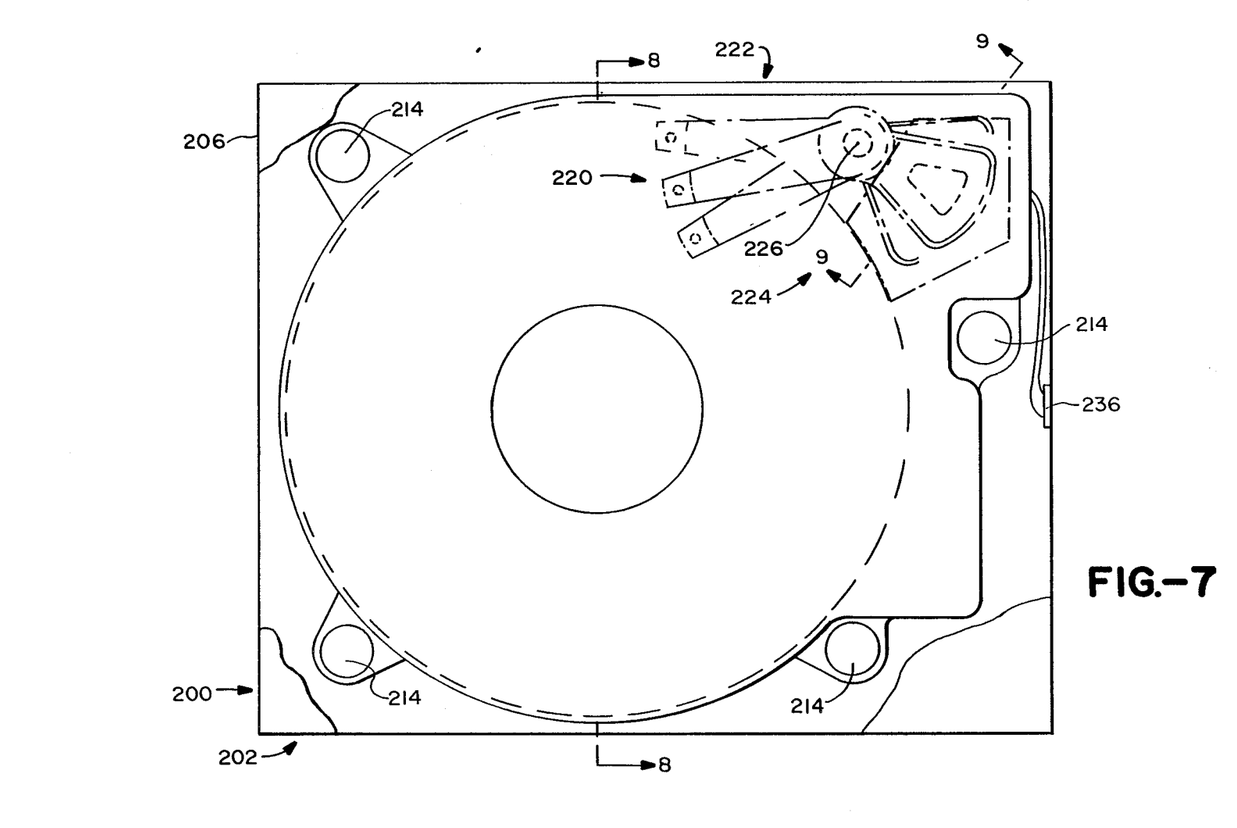
FIG. 7 is a top, partially cut away view of another embodiment of the cartridge invention.
Figure 8:
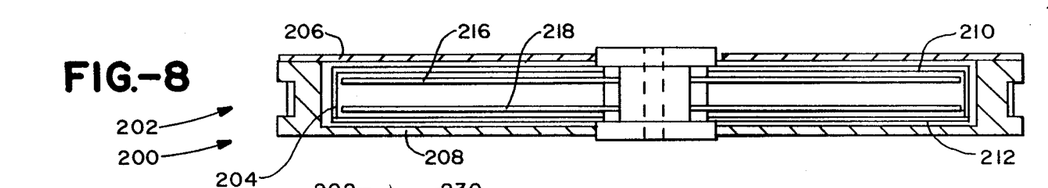
FIG. 8 is a section view taken through line 8—8 of FIG. 7.
Figure 9:
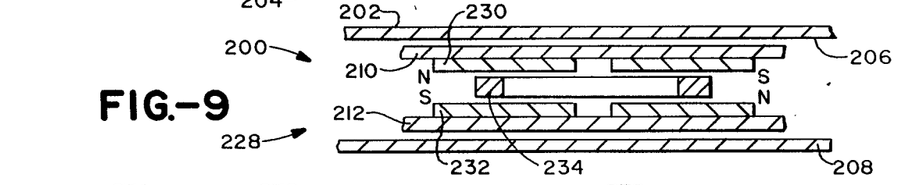
FIG. 9 is a section view taken through line 9—9 of FIG. 7.

Another embodiment 200 of the removable cartridge of the present invention is depicted in FIGS. 7, 8 and 9. This embodiment includes an outer housing 202 and an inner housing 204. The outer housing 202 includes a top 206 and a base 208 and the inner housing 204 includes a top 210 and a base 212. In FIG. 7 the top 206 of the cartridge 200 has been partially cut away in order to reveal the positioning of the inner housing 204. The inner housing 204 is mounted to the base 208 of the outer housing 202 with shock mounts 214. In a preferred embodiment the shock mounts 214 can include, by way of example only, rubber mounts used to secure the inner housing 204 to the outer housing 202. The top 206 and the base 208 of the outer housing 202 are sealed together by methods known in the trade in order to prevent additional contaminants from reaching inside of the outer housing. Similarly, the top 210 and the base 212 of the inner housing 204 are sealed in order to prevent additional contaminants from reaching the inside of the inner housing.

The present embodiment has the advantage that should the cartridge 200 be dropped, the housing and the shock mounts insulate the discs 216, 218 from the shock of impact.

The four heads 220 mounted on the head arm assembly 222 are also insulated from shock by the shock mounts 214. The heads 220 and the head arm assembly 222 are shown in phantom in FIG. 7. Also shown in phantom in FIG. 7 is the actuator assembly 224. The head arm assembly 222 and the actuator assembly 224 pivot about axis 226 as is demonstrated by the three positions of the heads 220 shown in phantom in FIG. 7. As can be seen in FIG. 9, the actuator assembly 224 includes a voice coil type mechanism 228 which has upper and lower permanent magnets 230, 232 and an electromagnet 234. The permanent magnets 230, 232 which are affixed to the top 210 and base 212 of the inner house 204, respectively. The electromagnet 234 is mounted on an extension of the head arm assembly 222 pivot about axis 226 such that as the current to the electromagnet 234 changes, the position of the electromagent 234 and the position of the arm assembly 222 and heads 220 change in order to position the heads at a desired location relative to the tracks on the discs 216, 218. A connector 236 is provided for communicating data signals to and from the heads 220 and position signals to the actuator assembly 224. The connector 236 mates with a conductor postioned in the drive as demonstrated by the other embodiments.

Figure 10:
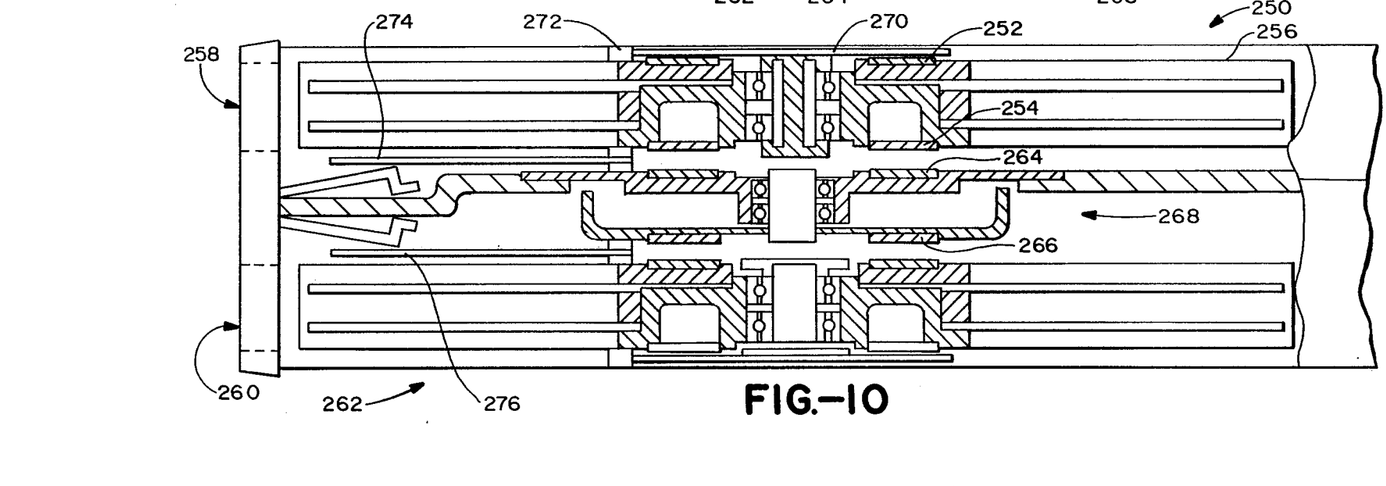
FIG. 10 is still another embodiment of the drive and cartridge of the present invention shown in a view similar to the view of FIG. 8.

In viewing FIG. 10, an alternative embodiment 250 of the removable cartridge is depicted positioned in a drive 262. In this embodiment, each cartridge includes upper and lower magnetic armature plates 252, 254. These armature plates 252, 254 extend from the outer housing 256 of the cartridge 250. In this arrangement, the cartridge 250 can be positioned in either the upper receiving mechanism 258 or the lower receiving mechanism 260 of the drive 262 without inverting the cartridge as in either receiving mechanism 258, 260, both the upper clutch plate 264 and the lower clutch plate 266 of the spindle motor 268 are magnetic and can engage either the upper armature plate 252 or the lower armature plate 254 which is placed adjacent thereto.

In this embodiment, the cartridge 250 includes shutter mechanisms such as shutter mechanism 270 which are used to cover both the upper and lower armature plate 252, 254. The shutter mechanism 270 is comprised of a material, known in the art, which can provide a magnetic field shield. The shutter mechanisms are spring loaded by spring mechanism 272. Just prior to the cartridge 250 being ejected from the drive, the drive releases the spring mechanism 272 so that the spring mechanism 272 can cause the shutter 270 to be positioned over the magnetic armature plates 252, 254 in order to break the magnetic bond between the armature plates and the clutch plates. With the cartridge removed from the drive, the shutter prevents metallic objects from being attracted to the armature plates. When the cartridge is in positioned in the drive, the drive overrides the spring mechanism 272 to urge the shutter 270 away from its covering postion exposing the magnetic field of the armature plate 254 to the magnetic field of the clutch plate 264 of the spindle motor 268. In FIG. 10, shutters 274, 276 have been urged into non-shielding positions.

Figure 11:
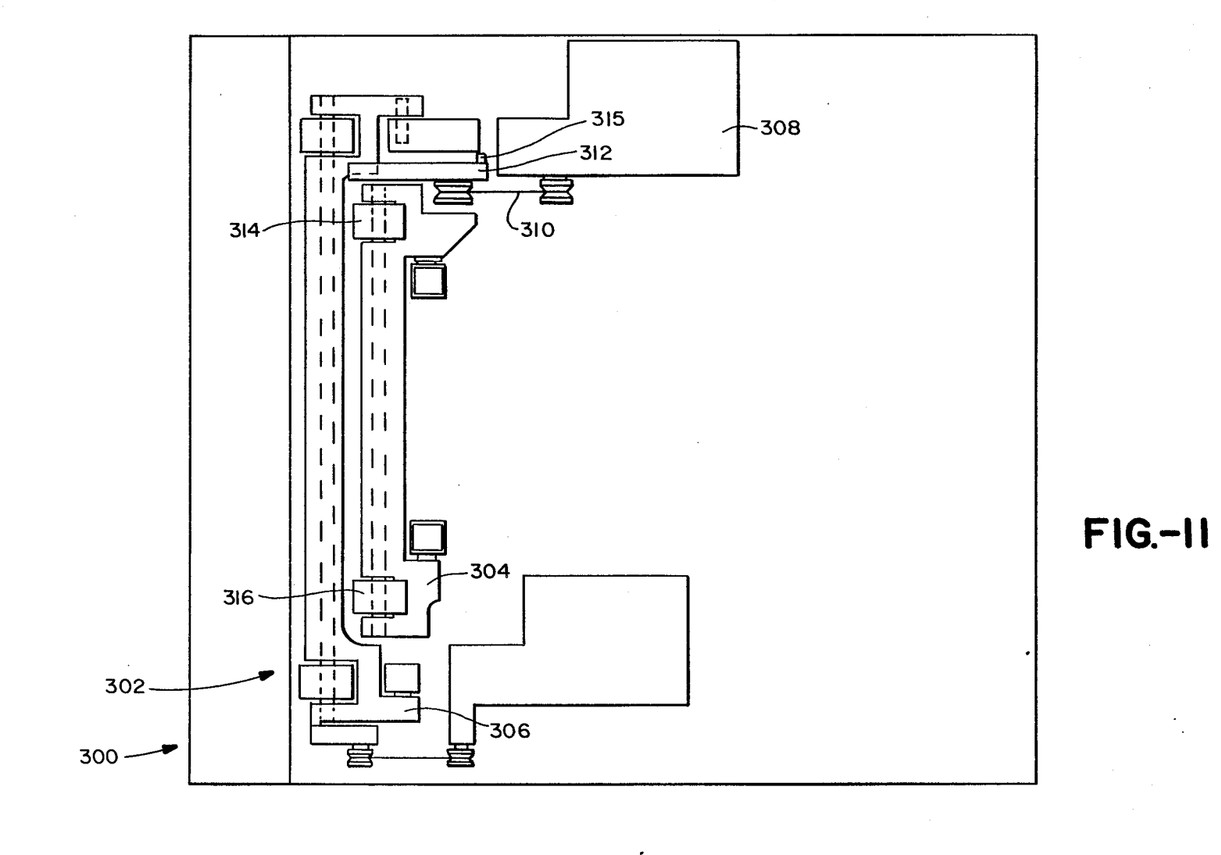
FIG. 11 is a top view with the top plate and certain elements removed of another embodiment of the drive of the present invention.

FIG. 11 depicts yet an alternate embodiment 300 of the drive with a cartridge loading mechanism 302. This loading mechanism 302 includes an upper loading mechanism 304 and a lower loading mechanism 306. The upper loading mechanism 304 is used to urge the cartridge into and eject the cartridge out of the the upper receiving mechanism while the lower loading mechanism 306 is used similarly in conjunction the lower port. The upper loading mechanism 304 includes a motor 308 and a pulley arrangement 310 which links the motor to a spring loaded mounting frame 312, which mounts rollers 314, 316. Through the pulley 310, the motor 308 can drive the rollers 314, 316 in order to urge the cartridge into the housing and eject the cartridge from the housing. Associated with the frame is a microswitch 315. As the cartridge is urged into housing and contacts with the rollers 314, 316, the spring loaded frame 312 is urged from its rest position triggering microswitch 315 which causes the motor 308 to turn on causing the rollers 314, 316 to urge the cartridge into the drive. An eject button on the face of the drive causes the motor to drive the rollers 314, 316 in the opposite direction ejecting the cartridge. The lower load mechanism 306 works in a similar manner.

INDUSTRIAL APPLICABILITY

From the description of the preferred embodiment and the operation of the invention it is readily apparent that the disc drive 20 of the present invention provides for a simple, efficient, and economical drive and hermetically sealed cartridge. The drive contains a spindle motor having a magnetic clutch plate for magnetically engaging the magnetic armature plate of the cartridge so that there is not contact between the cartridge and the spindle motor assembly. Thus the receiver mechanism of the disc drive is not required to align the discs with the spindle motor using the expensive techniques of the prior art devices.

Further the actuator is divided into components, one located in the drive and the other in the cartridge so that the cartridge can be completely sealed with the heads 80, 81 permanently located in the cartridge 22 and positioned with respect to the discs 72, 74. As the cartridge is truly sealed, unlike prior art devices which require shutter doors to allow access into the cartridge, cartridge contamination can all but be eliminated. As a further advantage, time constraints dealing with loading and unloading the heads with respect to the disc are eliminated as the heads are always loaded onto the disc. Additionally the potential damage to the heads or the disc, or misalignment problems caused by loading and unloading operations are eliminated.

The present invention also provides for a data transfer connector which is an infrared signal sender and sensor so that the cartridge and the housing do not have to be connected.

Further it is evident that the cartridge 22 is ruggedized so that it can withstand harsh treatment while being transported from device to device.

Other aspects and objects of the invention can be obtained from review of the figures and the appended claims.

It is to be understood that other embodiments of the present invention can be provided which fall within the spirit and scope of the present claims.

I claim:

1. A sealed cartridge adapted for selective use in a disc drive which disc drive has a first electromagnetic actuator means, said sealed cartridge comprising:
    a sealed housing;
    a disc positioned in said housing;
    a magnetic head positioned in said housing adjacent said disc so that data can be transmitted to or read from said disc;
    means for rotationally mounting said disc in said housing;
    second electromagnetic actuator means attached to said magnetic head within said sealed housing, the first electromagnetic actuator means spaced from said second electromagnetic actuator means with the cartridge located in the disc drive, said second electromagnetic actuator means for moving said magnetic head relative to said disc due to an electromagnetic field produced between said second electromagnetic actuator means and the first electromagnetic actuator means; and
    magnetic coupling means for magnetically coupling said disc to the disc drive, in order to allow the disc drive to rotate said disc, without the magnetic coupling means physically touching the disc drive.

2. The apparatus of claim 1 wherein said second electromagnetic actuator means includes an electromagnet.

3. The apparatus of claim 1 wherein said second electromagnetic actuator means includes a permanent magnet.

4. The apparatus of claim 1 wherein said magnetic coupling means includes a magnet operably secured to said disc and having sequentially postioned alternating magnetic poles.

5. The apparatus of claim 1 including connection means adapted for transferring data between said head and the disc drive.

6. The apparatus of claim 5 wherein said connection means includes:
    means for using light to transfer data.

7. The apparatus of claim 5 wherein said connection means includes:
    means for using infrared wavelengths to transfer data.

8. The apparatus of claim 5 wherein said connection means includes an electromagnet.

9. The apparatus of claim 5 including:
    battery means communicating with said connection means for facilitating the transfer of data between the head and the disc drive through the connector means.

10. The apparatus of claim 5 wherein said connection means includes means for transferring electrical current into said cartridge for operating said second electromagnetic actuator means.

11. The apparatus of claim 1 wherein said disc is hermetically sealed inside said housing.

12. The apparatus of claim 11 wherein:
    said housing is filled with an inert gas.

13. The apparatus of claim 1 wherein said housing includes:
    a plastic outer casing; and
    a metallic inner casing means for supporting said rotationally mounting means and said second electromagnetic actuator means.

14. The apparatus of claim 1 wherein:
    at least two discs are positioned in said housing; and
    at least four heads are positioned in said housing adjacent said discs.

15. A cartridge adapted for selected use in a disc drive, which disc drive has a first electromagnetic actuator means, said cartridge comprising:
    a housing;
    a disc positioned in said housing,
    a head positioned in said housing adjacent said disc so that data can be transmitted to or read from said disc;
    means for rotationally mounting said disc in said housing;
    second electromagnetic actuator means attached to said head within said housing, the first electromagnetic actuator means spaced from said second electromagnetic actuator means with the cartridge located in the disc drive, said second electromagnetic actuator means for moving said head relative to said disc due to an electromagnetic field produced between said second electromagnetic actuator means and the first electromagnetic actuator means;
    magnetic coupling means for magnetically coupling said disc to the disc drive, in order to allow the disc drive to rotate said disc, without the magnetic coupling means physically touching the disc drive.

16. The apparatus of claim 15 wherein said second electromagnetic actuator means includes an electromagnet.

17. The apparatus of claim 15 wherein said second electromagnetic actuator means includes a permanent magnet.

18. The apparatus of claim 15 wherein said magnetic coupling means includes a magnet operably secured to said disc and having sequentially positioned alternating magnetic poles.

19. The apparatus of claim 15 including connection means adapted for transferring data between said head and the disc drive.

20. The apparatus of claim 19 wherein said connection means includes:
    means for using light to transfer data.

21. The apparatus of claim 19 wherein said connection means includes:
    means for using infrared wavelengths to transfer data.

22. The apparatus of claim 19 wherein said connection means includes:
    an electromagnet.

23. The apparatus of claim 19 including:
  battery means communicating with said connection means for facilitating the transfer of data between the head and the disc drive through the connector connection means.

24. The apparatus of claim 19 wherein said connection means includes means for transferring electrical current into said cartridge for operating said second electromagnetic actuator means.

25. The apparatus of claim 15 wherein said disc is hermetically sealed inside said housing.

26. The apparatus of claim 25 wherein:
  said housing is filled with an inert gas.

27. The apparatus of claim 15 wherein said housing includes:
  a plastic outer casing; and
  a metallic inner casing means for supporting said rotationally mounting means and said second electromagnetic actuator means.

28. The apparatus of claim 15 wherein:
  at least two discs are positioned in said housing; and
  at least four heads are positioned in said housing adjacent said discs.

29. A cartridge adapted for selective use in a disc drive, which disc drive has a first electromagnetic actuator means, said cartridge comprising:
  a housing;
  a disc positioned in said housing;
  a magnetic head positioned in said housing adjacent said disc so that data can be transmitted to or read from said disc;
  means for rotationally mounting said disc in said housing;
  second electromagnetic actuator means attached to said magnetic head within said housing, the first electromagnetic actuator means spaced from said second electromagnetic actuator means with the cartridge located in the disc drive, said second electromagnetic actuator means for moving said magnetic head relative to said disc due to an electromagnetic field produced between said second electromagnetic actuator means and the first electromagnetic actuator means;
  coupling means for coupling said disc to the disc drive, in order to allow the disc drive to rotate said disc, without the coupling means physically touching the disc drive.

30. A sealed cartridge adapted for selective use in a disc drive, which disc drive has a first electromagnetic actuator means, said sealed cartridge comprising:
  a sealed outer housing;
  an inner housing;
  means for mounting said inner housing inside of said outer housing in order to insulate said inner housing from shock;
  a disc positioned in said inner housing;
  a magnetic head positioned in said inner housing adjacent said disc so that data can be transmitted to or read from said disc;
  means for rotationally mounting said disc in said inner housing;
  second electromagnetic actuator means attached to said magnetic head within said sealed outer housing, the first electromagnetic actuator means spaced from said second electromagnetic actuator means with the cartridge located in the disc drive, said second electromagnetic actuator means for moving said magnetic head relative to said disc due to an electromagnetic field provided between said second electromagnetic actuator means and the first electromagnetic actuator means; and
  magnetic coupling means for magnetically coupling said disc to the disc drive, in order to allow the disc drive to rotate said disc, without the magnetic coupling means physically touching the disc drive.

31. The apparatus of claim 30 wherein said second electromagnetic actuator means includes a portion of a voice coil motor.

32. The apparatus of claim 30 wherein:
  said outer housing includes first and second major planar surfaces; and
  said magnetic coupling means includes a first magnetic coupling surface located adjacent said first major planar surface and a second magnetic coupling surface located adjacent said second major planar surface.

33. The apparatus of claim 30 including:
  shutter means for selectively covering said magnetic coupling means in conjunction with the removal of the cartridge from a disc drive.

34. The apparatus of claim 33 wherein said shutter means is biased toward a covering position.

35. The apparatus of claim 30 wherein said magnetic coupling means includes a magnet operably secured to said disc and having sequentially positioned alternating magnetic poles.

36. The apparatus of claim 30 including connection means adapted for transferring data between said magnetic head and the disc drive.

37. The apparatus of claim 36 wherein said connection means includes:
  means for using light to transfer data.

38. The apparatus of claim 36 wherein said connection means includes:
  means for using infrared wavelengths to transfer data.

39. The apparatus of claim 36 wherein said connection means includes an electromagnet.

40. The apparatus of claim 36 including:
  battery means communicating with said connection means for facilitating the transfer of data between the magnetic head and the disc drive through the connection means.

41. The apparatus of claim 30 wherein said disc is hermetically sealed inside said inner housing.

42. The apparatus of claim 41 wherein:
  said inner housing is filled with an inert gas.

43. A sealed cartridge adapted for selective use in a disc drive, said sealed cartridge comprising:
  a sealed housing;
  a disc positioned in said housing;
  a magnetic head mounted on an arm and positioned in said housing adjacent said disc so that data can be transmitted to or read from said disc;
  means for rotationally mounting said disc in said housing;
  electromagnetic actuator means including a first portion and a second portion, said first portion attached to said arm within said sealed housing, said second portion attached to said housing and spaced from said first portion, said electromagnetic actuator means for moving said magnetic head relative to said disc due to an electromagnetic field produced between said first portion and said second portion of said electromagnetic actuator means; and coupling means for coupling said disc to the disc drive, in order to allow the disc drive to rotate said disc.

44. The apparatus of claim 43 wherein:

said coupling means include magnetic coupling means adapted for magnetically coupling said disc to the disc drive in order to allow the disc drive to rotate said disc, without the magnetic coupling means physically touching the disc drive.

45. The apparatus of claim 43 wherein said electromagnetic actuator means includes a voice coil motor.

* * * * *

UNITED STATES PATENT AND TRADEMARK OFFICE
CERTIFICATE OF CORRECTION

PATENT NO. : 4,965,691

DATED : October 23, 1990

INVENTOR(S) : Syed Iftikar and John J. Mandish

It is certified that error appears in the above-identified patent and that said Letters Patent is hereby corrected as shown below:

IN THE ABSTRACT

Line 1, after the numeral "22", please delete the word "vor" and insert in its place --for--.

Signed and Sealed this

Twenty-fifth Day of February, 1992

Attest:

HARRY F. MANBECK, JR.

Attesting Officer          Commissioner of Patents and Trademarks